(12) United States Patent
Herst et al.

(10) Patent No.: US 12,467,584 B2
(45) Date of Patent: Nov. 11, 2025

(54) UNIVERSAL SUPPORT PLATFORM FOR CAMERA ENABLED MOBILE COMPUTER DEVICES

(71) Applicant: Herst Ventures, Inc., Berkeley, CA (US)

(72) Inventors: Douglas J. Herst, Ross, CA (US); Frank A. Friedman, Mill Valley, CA (US)

(73) Assignee: Herst Ventures, Inc., Berkeley, CA (US)

( * ) Notice: Subject to any disclaimer, the term of this patent is extended or adjusted under 35 U.S.C. 154(b) by 0 days.

(21) Appl. No.: 18/583,638

(22) Filed: Feb. 21, 2024

(65) Prior Publication Data

US 2024/0191836 A1    Jun. 13, 2024

Related U.S. Application Data

(63) Continuation of application No. 17/814,183, filed on Jul. 21, 2022, now Pat. No. 11,913,601, which is a continuation of application No. PCT/US2022/011503, filed on Jan. 6, 2022.

(60) Provisional application No. 63/134,928, filed on Jan. 7, 2021.

(51) Int. Cl.
| | |
|---|---|
| *F16M 11/00* | (2006.01) |
| *B60R 11/02* | (2006.01) |
| *F16M 11/06* | (2006.01) |
| *F16M 11/26* | (2006.01) |
| *F16M 13/02* | (2006.01) |
| *G06F 1/16* | (2006.01) |

(52) U.S. Cl.
CPC ....... *F16M 13/022* (2013.01); *B60R 11/0252* (2013.01); *F16M 11/06* (2013.01); *F16M 11/26* (2013.01); *G06F 1/1626* (2013.01)

(58) Field of Classification Search
CPC ...... F16M 13/022; F16M 11/06; F16M 11/26; B60R 11/0252; G06F 1/1626; G03B 15/02; G03B 30/00; G03B 17/561
See application file for complete search history.

(56) References Cited

U.S. PATENT DOCUMENTS

| | | | | |
|---|---|---|---|---|
| 7,611,112 | B2 * | 11/2009 | Lin | F16M 11/10 |
| | | | | 248/274.1 |
| 8,991,319 | B2 * | 3/2015 | Korpi | A47B 23/043 |
| | | | | 108/44 |
| 11,143,355 | B1 * | 10/2021 | Huang | F16M 11/10 |

* cited by examiner

*Primary Examiner* — Amy J. Sterling
(74) *Attorney, Agent, or Firm* — Beeson Skinner Beverly, LLP

(57) ABSTRACT

A universal support platform for supporting different camera enabled mobile computer devices, such as laptop computers, tablets and cell phones, that have a display screen and camera coverage areas in front of the display screen and that are used for creating video sessions such as for on-line meetings, webinars and podcasts. The support platform includes mobile device support platform configured to support a laptop computer such that it's folded out display screen and camera can be positioned to face the user, and an adaptor for the mobile device support platform for holding planar tablets, cell phones and the like in the same or similar user facing orientation. The platform can also be configured as a device that only holds planar camera enabled mobile computer devices such as tablets and cell phones in a user facing orientation.

12 Claims, 19 Drawing Sheets

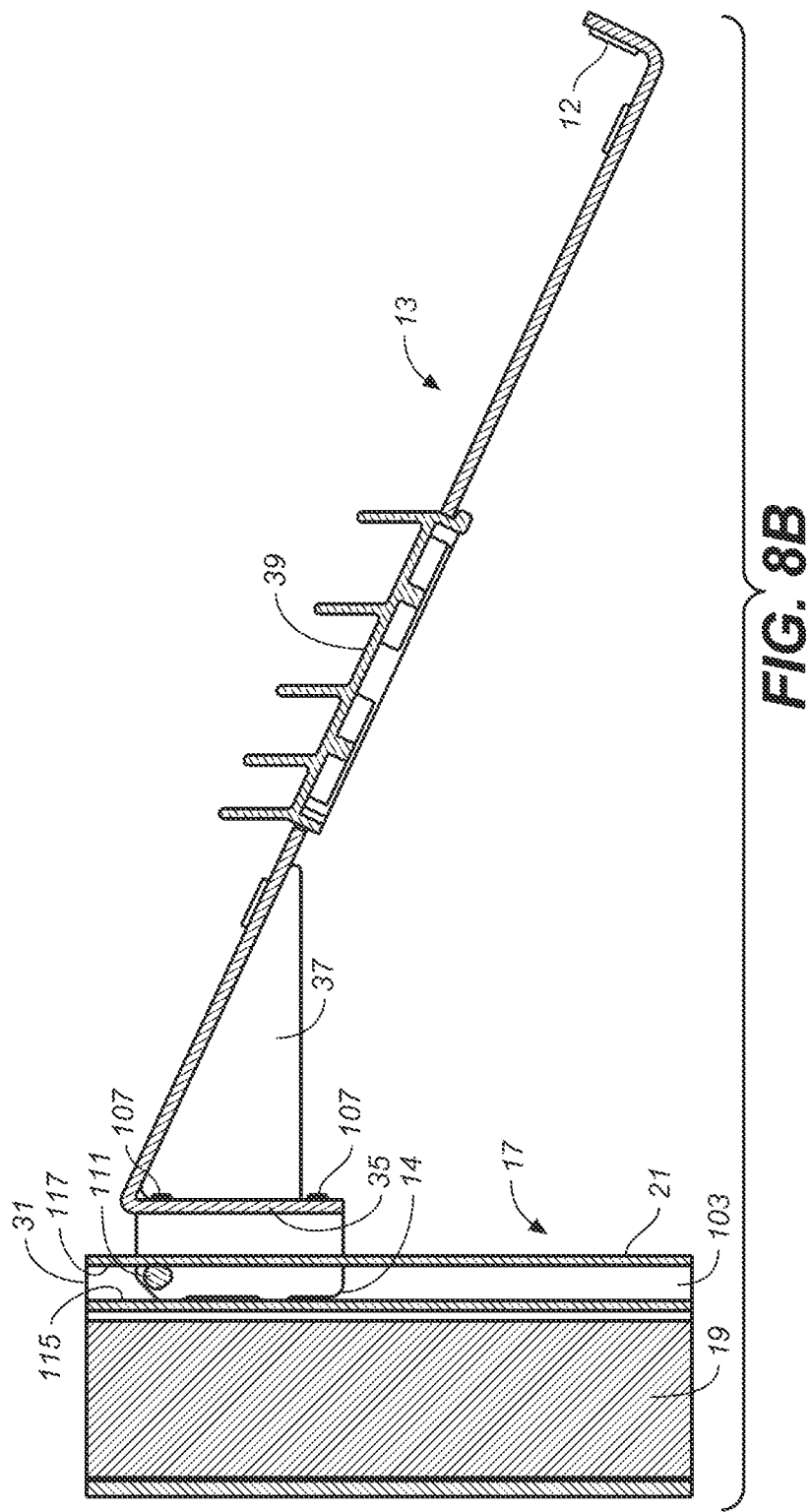

UNIVERSAL SUPPORT PLATFORM FOR CAMERA ENABLED MOBILE COMPUTER DEVICES

CROSS-REFERENCE TO RELATED APPLICATIONS

This application is a continuation U.S. patent application Ser. No. 17/814,183 filed Jul. 21, 2022, which is a continuation of International Application No. PCT/US22/11503 filed Jan. 6, 2022, which claims the benefit of U.S. Provisional Patent Application No. 63/134,928, filed Jan. 7, 2021, all of which are incorporated herein by reference.

BACKGROUND

The present invention relates to the use of camera enabled computer devices for video sessions arranged through various commercially available video conferencing platforms, and more particularly to accessories used to facilitate and improve the video session experience. The invention provides a convenient facility for optimally positioning various camera enabled mobile computer devices, such as laptops, tablets and cell phones, at a position that is ergonomically suited to the user when engaged in a video session, such as engaging in a video conference with business associates or a video session between family members or making a presentation during a webinar or podcast.

The practice of connecting remotely through various computer applications such as Zoom®, WebEx® and Microsoft Teams® is widespread and increasing. Family members, friends and business colleagues are increasingly reliant on this mode of staying connected, particularly during times and circumstances that make face-to-face gatherings unduly costly, unsafe or impractical. Participants might attend such video sessions using their desktop computer with a built in camera or separate webcam attached to the top of the computer monitor. But quite often participants in video sessions will be attending via a mobile computer device (laptop, tablet or cell phone) having a built in camera. In doing so, they will need to hold the device in front of them or set or prop it up on an available surface to allow the face of the user to be seen by other participants on the video session. Often this results in the user struggling to keep the mobile device well positioned for the session or placing the device in a less than optimal position. And most often the user ends up in a compromised, ergonomically poor position in order to keep proper alignment between the user's face and the mobile device's camera.

In addition to such positioning struggles, camera enabled mobile devices are often used in environments where the user's face is not properly lit for viewing. With poor lighting, dark shadows can appear on the user's facial features, or the facial features can be washed out. As mobile devices are moved about to participate in a video session, the facial lighting can suddenly and unpredictably change from decent lighting to dreadfully poor lighting of the facial features.

The present invention provides a solution to the difficulties in creating and maintaining a video session environment that is ergonomically sound for users of different types of camera enabled mobile computer devices. The invention provides a support platform that can readily be adapted to receive and hold clamshell style mobile computer devices such as laptop computers, and planar or flat mobile computer devices such as tablets and cell phones, and to do so where each can be held in a position that is compatible with viewing angle requirements for a video session. Aspects of the invention further address the challenges in creating optimal lighting environments for video sessions and to do so with a single supporting apparatus and to facilitate the adjustment features of the apparatus as circumstances require.

SUMMARY OF THE INVENTION

The invention is directed to a support platform for optimally positioning varied camera enabled mobile computer devices for viewing by persons who use the mobile computer devices for video sessions or otherwise. Camera enabled mobile computer devices capable of being supported on the support platform of the invention include planar mobile computer devices having a display screen with a key pad in the plane of the device and clamshell mobile computer devices having a generally planar base with a keyboard and a display screen that in use is folded out from the planar base as is the case with most laptop computers.

More specifically, the support platform of the invention is configured to support the planar base of a clamshell mobile computer device such that, when folded out, the display screen of the clamshell mobile computer device is positioned a suitable forward facing orientation for viewing and a video session. The support platform is additionally configured to capture and hold the edge of a planar mobile device, such as a tablet or cell phone, so as to likewise position the display screen of the planar mobile device in a suitable forward facing orientation for viewing and a video session. In one aspect of the invention, the support platform is configured to capture and hold the edges of planar mobile devices having different thicknesses. In another aspect of the invention, the support platform includes a plurality of upright transverse channels with each channel having a different channel width corresponding to the standard thicknesses of different planar mobile devices.

A further aspect of the invention a removable adapter is provided with the support platform for holding the planar mobile devices, including devices having different thickness profiles. The removable adaptor can be configured so that it plugs into a vent opening in the device support platform.

While the support platform of the invention is described herein in connection with a support apparatus with an upright support structure on which the support platform can be adjustable connected, it will be understood that the support platform of the invention with or without a removable adapter could provide a stand-alone support platform that can support different camera enabled mobile computer devices on a working surface such as a tabletop or desktop.

Other aspects of the invention will be apparent from the following description and accompanying drawings as well as the following claims.

BRIEF DESCRIPTION OF THE DRAWINGS

FIG. 8B is a fragmentary, cross-sectional view of the vertical post assembly and the device support platform of the apparatus shown in the foregoing figures, showing the device support platform connected to the vertical post assembly.

DETAILED DESCRIPTION OF ILLUSTRATED EMBODIMENTS

Figure 1:
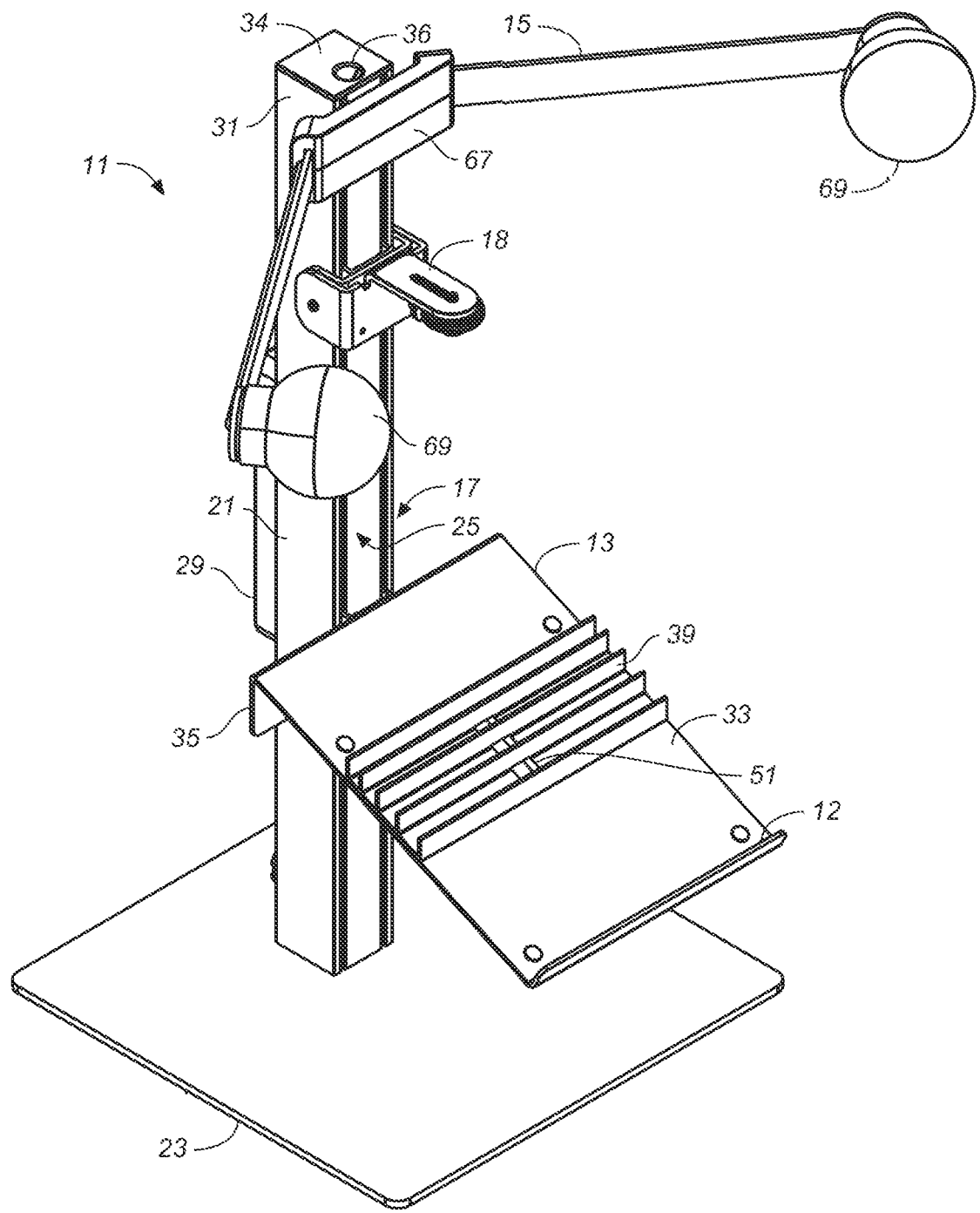
FIG. 1 is a front, left side perspective view of a mobile computer device support apparatus having a device support platform in accordance with the invention.
Figure 1A:
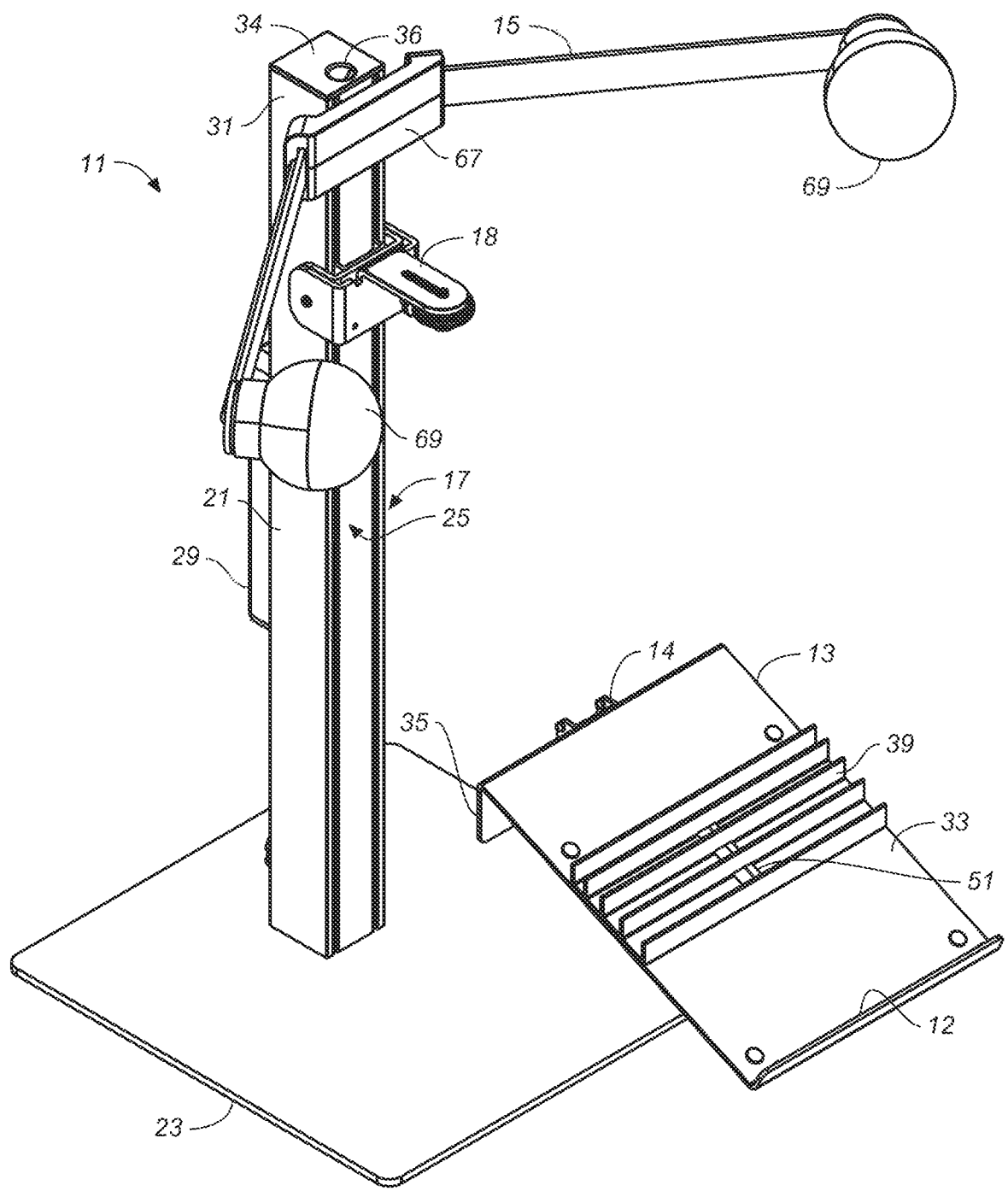
FIG. 1A is the same view of the mobile computer device support apparatus shown in FIG. 1, but with the device support platform of the support apparatus exploded off of the vertical post assembly of the device support apparatus.

It will be understood that, unless otherwise stated, use herein of the indefinite article "a" or "an" or the definite article "the" is not intended to limit the referenced item or structure to a single item or structure, but rather shall be interpreted as allowing for the use or presence of more than one of the referenced item or structure.

Referring now to the drawings, FIGS. 1-5 illustrate a support apparatus in accordance with the invention wherein the support apparatus, denoted by the numeral 11, includes a mobile device support platform 13 for supporting a mobile computer device, a facial lighting unit 15 for illuminating the user, and an upright support structure in the form of vertical post assembly 17. As hereinafter described, the mobile device support platform and facial lighting unit are attached to the vertical post assembly so as to be height adjustable. Additional height adjustable auxiliary devices, such as a camera or teleprompter, can be attached to the vertical post assembly facing the user. The mounting bracket 18 on the post assembly shown in FIGS. 1-5 provides this capability.

Figure 1B:
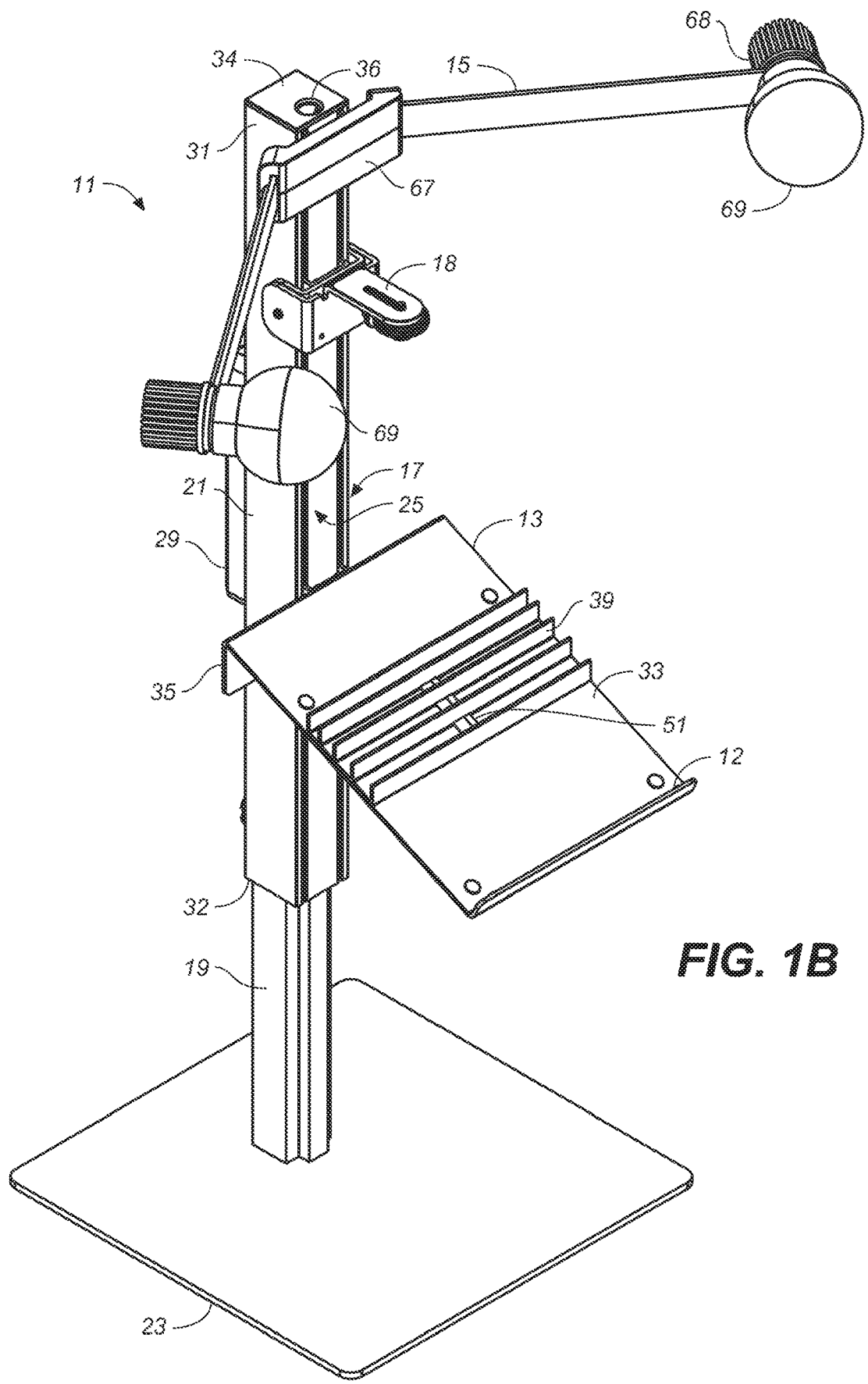
FIG. 1B is the same view of the mobile computer device support apparatus shown in FIG. 1, but with the outer slide post of the vertical post assembly raised up on the support apparatus's inner anchor post to adjust the height of the device support platform of the support apparatus.
Figure 2:
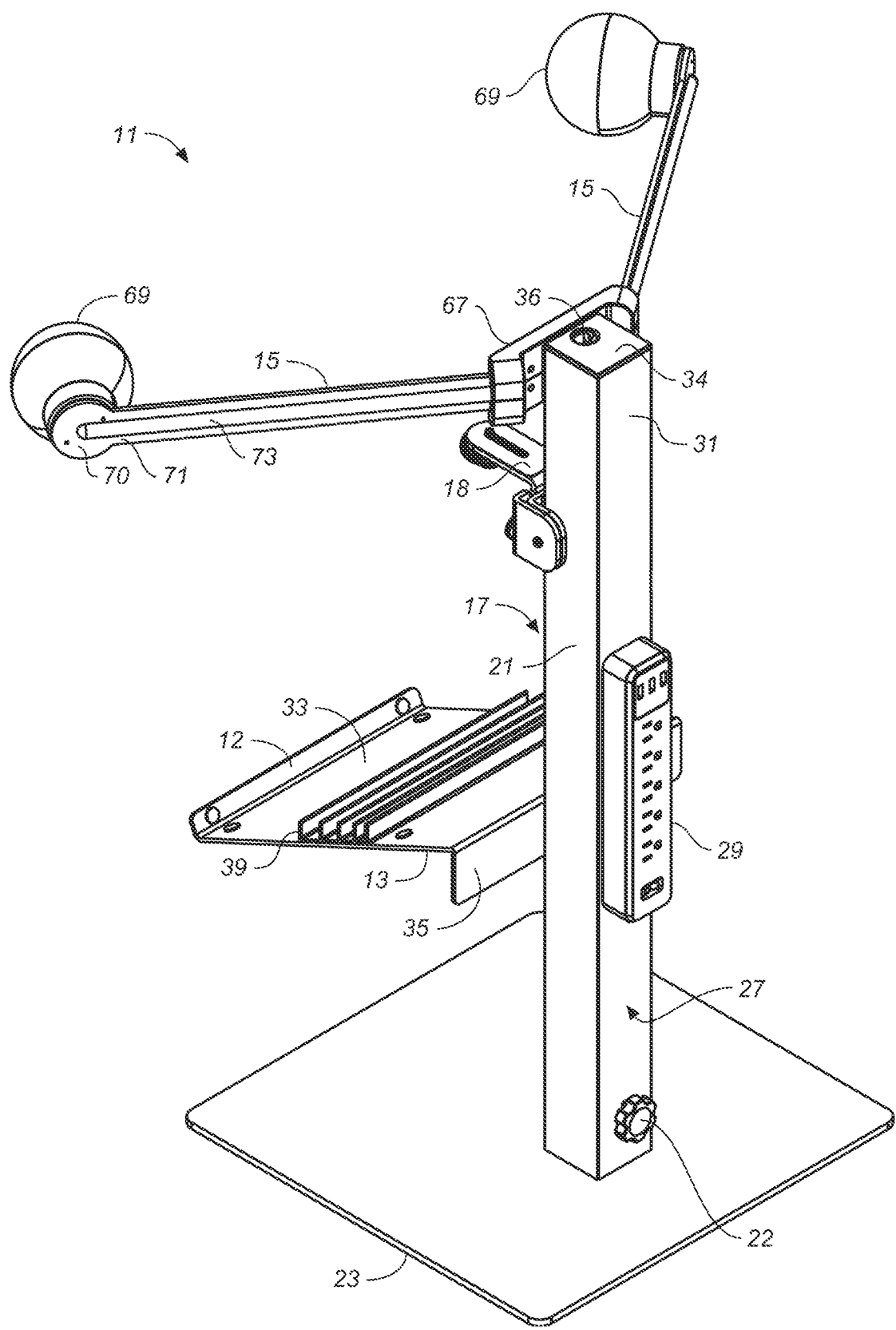
FIG. 2 is a rear perspective view of the mobile computer device support apparatus shown in FIG. 1.

As best seen in FIG. 1B, the vertical post assembly of the illustrated embodiment is comprised of an inner anchor post 19 attached to a footer structure and an outer slide post 21 that fits over and can slide on the anchor post. The footer structure can suitably be a square or rectangular flat footer plate 23 of a suitable size and weigh to maintain the stability of the support apparatus in an upright position when in use. It will be appreciated that, in addition to the footer structure later described in reference to FIGS. 13 and 14, the footer structure could take other forms, such as a U-shaped stand or one or more clamps that could be used to clamp the apparatus to the edge of a countertop or desk top. Interchangeable standing and clamping structures could be provided for setups in different physical environments.

As described in more detail below, the device support platform and facial lighting unit are both adjustably attached to the outer slide post 21 of the post assembly 17 at different locations on the slide post. This allows up and down positional adjustments of each of these components on the slide post, including the adjustment of their relative spacing. As also described in more detail below, the outer slide post 21 can in turn be height adjusted on the anchor post 19 of the post assembly to allow for up and down adjustment of the facial lighting unit and the device support platform so as to maintain their preset spacing. In this way, once a spacing of the lighting unit and the device support platform is established that achieves optimal lighting conditions for the user in one position, for example, in a sitting position, these two components can readily be moved in tandem when the user changes positions, for example from a sitting position to a standing position. (Any other auxiliary devices, such as a camera or teleprompter, that may be attached to the outer slide post will similarly be moved in tandem with the mobile device support platform and facial lighting unit when the slide post is moved on the anchor post—see FIG. 9 and discussion of cameras and teleprompters below.) Having the ability to move all of the components at once in this manner makes it easier for the user to move from a sitting to a standing position or from a standing to a sitting position very quickly, which contributes to good body health with less fatigue for the all-day users.

The outer slide post is seen to have a forward facing side 25 to which the facial lighting unit 15 and device support platform 13 are attached, placing them in front of the user, and a rear facing side 27 to which a power strip 29 can be attached. Both anchor and slide posts are suitably about the same length such that, when in the down position shown, for example, in FIG. 1, the top end 31 of the slide post is at about the same height as the anchor post while the bottom end 32 of the slide post abuts or nearly abuts the footer plate 23. (The top end of the slide post is covered by a removable cap 34 having a finger hole 36 for ease of removing the cap.) As more fully described below, the desired elevation of the slide post on the anchor post can be set by an easily accessible screw knob 22 located on the rear-facing side of the slide post.

As also further described below, the mobile device support platform 13 is configured to support different mobile computer devices in a forward facing orientation, such that, as to any one of the mobile computer devices, a person positioned in front of the height adjusted mobile device support platform of the support apparatus is able to view the display screen of the mobile computer device supported on the device support platform while at the same time being within the camera coverage area of the mobile computer device. The illustrated mobile device support platform is seen to have an angled top wall 33 for supporting the mobile computer device and a backwall 35 that provides a structure useful in attaching the device support platform to the post assembly 17 as later described. (As also later described, an angled support surface of about 25 degrees is believed to be best suited to properly orient the folded-out display screen of a laptop computer.) Bracing plates 37 tucked against the underside of the top wall and backwall of the support platform provide additional rigidity to the platform. The entire support platform can be fabricated of a sheet metal, such as aluminum, resulting in a lightweight component that is easy to manipulate and that will not significantly raise the center of gravity of the standing apparatus. The inner and outer posts of post assembly 17 can suitably be fabricated from aluminum extrusions.

Unlike clamshell laptop computers that have a fold out screen where the screen and camera angle can be adjusted, the display screens and cameras for tablets and cell phones are in a fixed plane, with the camera pointing at an angle perpendicular to the planar mobile device. Simply laying these devices on the angled top wall 33 of device support platform 13 would not be workable as the display screen and camera would be pointed up at an awkward angle for the user, instead of facing the user when the user's face is positioned in front of the apparatus.

To overcome this positioning problem, an adapter 39 is provided for the mobile device support platform 13. The adaptor is configured to capture and hold the edge of different planar mobile devices, such as a tablet or cell phone, so as to position the display screen of the device in a suitable front facing orientation where it can be viewed by a user and where the user is within the camera coverage area of the camera for the mobile device.

In the illustrated embodiment, this is achieved by providing an adaptor with a plurality of transverse upright channels 41 of different widths on the top side 43 of the adaptor. These channels are selected to accommodate the different widths of commercially available tablets and cell phones, which can include tablets and cell phones with and without cases. The channels are provided with sufficient depth to capture and hold the edges of the tablets or cell phones (or any other planar computer device) such that these devices will be stably positioned in an upright orientation facing the user. The user need only select the channel that best fits the thickness of his or her particular mobile device and insert the bottom edge of his or her mobile device in the selected channel. The channels are preferably angled relative to the top surface of the support platform such that the mobile device stands up on the support platform in a vertical or near vertical orientation facing the user. More than one adaptor could be provided for the mobile device support platform of support apparatus 11 to provide for a range of capabilities in terms of holding different sized planar mobile devices and mobile devices encased in a range of casings of different thicknesses. (While the adaptor is described as being used with the support apparatus 11 illustrated and described herein, it will be understood that the adaptor could be used as a stand-alone device for supporting different sized planar mobile devices on different working surfaces such as a desk or table top.)

To provide means for affixing the adaptor 39 to the top wall 33 of mobile device support platform 13, the platform's top wall is provided with a plug-in opening 45 (seen in FIG. 3A) into which a correspondingly sized protruding male plug structure 47 on the bottom 49 of the adaptor can be inserted. To prevent the adaptor from becoming dislodged from the platform when the mobile device apparatus is in use, the plug-in opening 45 and male plug structure 47 of the adaptor are suitably sized to create a tight fit when the adaptor is plugged into the opening. The device support platform's plug-in opening is also preferably designed to provide a relatively large opening in the top wall of the platform with an adaptor plug structure to match. A large plug-in opening provides a suitably large vent opening through which heat generated by the laptop can escape.

The adapter 39 can suitably be fabricated as a single molded or 3-D printed plastic part. Most suitably the material selected for the adaptor will have sufficient rigidity to prevent the channel walls from flexing when a mobile device is edgewise inserted into the adapter channel. A suitable material for the adaptor would be nylon12. The oblong opening 51 shown in the center of the adapter provides an opening for device cables and power cords to be threaded so they can be plugged into the power strip 29 on the back of the vertical post assembly.

Figure 3:
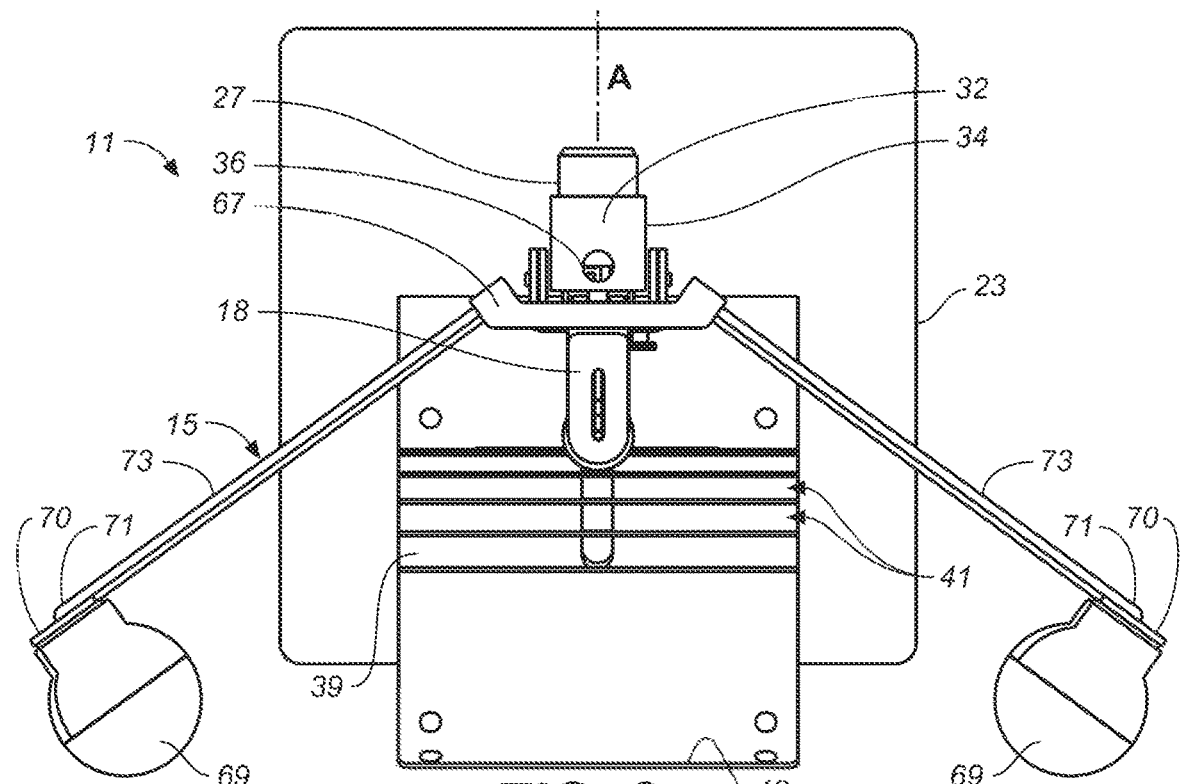
FIG. 3 is a top plan view thereof.
Figure 3A:
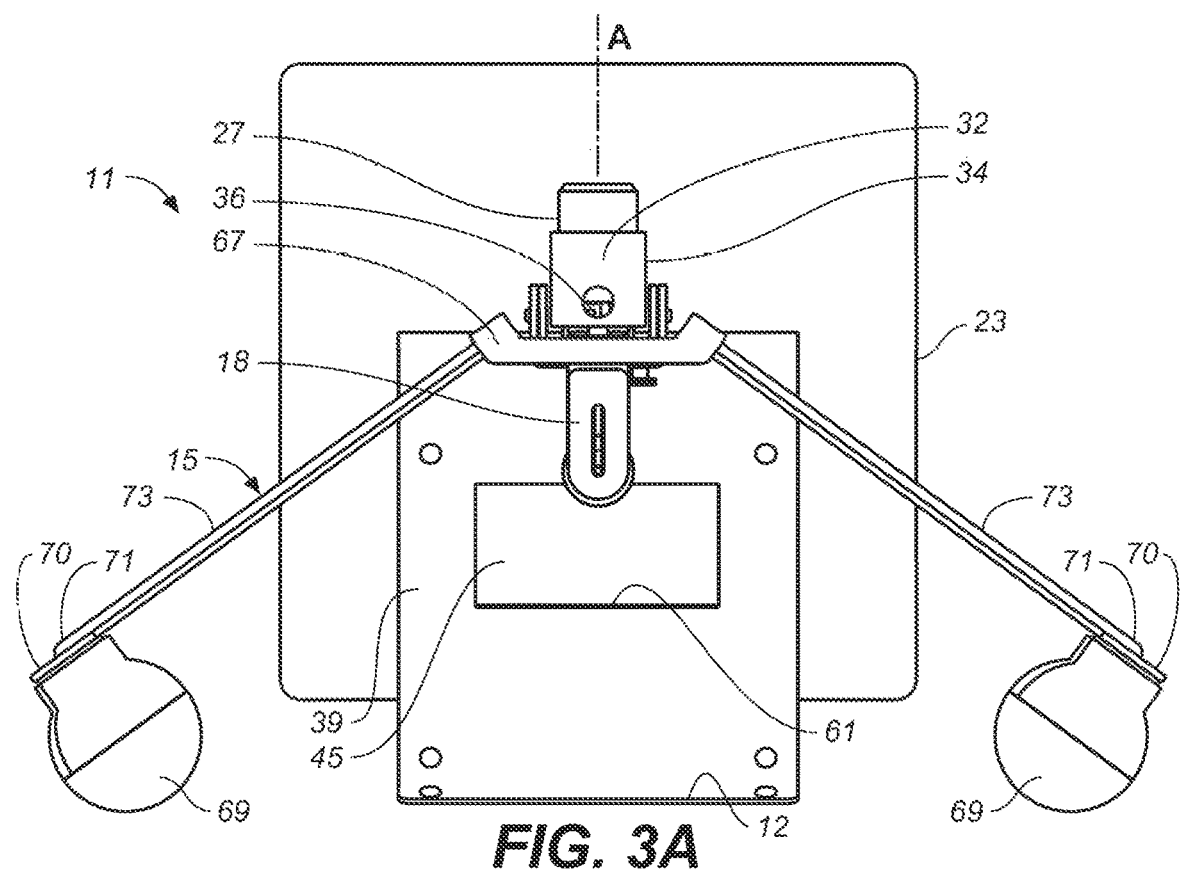
FIG. 3A is a top plan view thereof with the platform adaptor of the apparatus removed.
Figure 4:
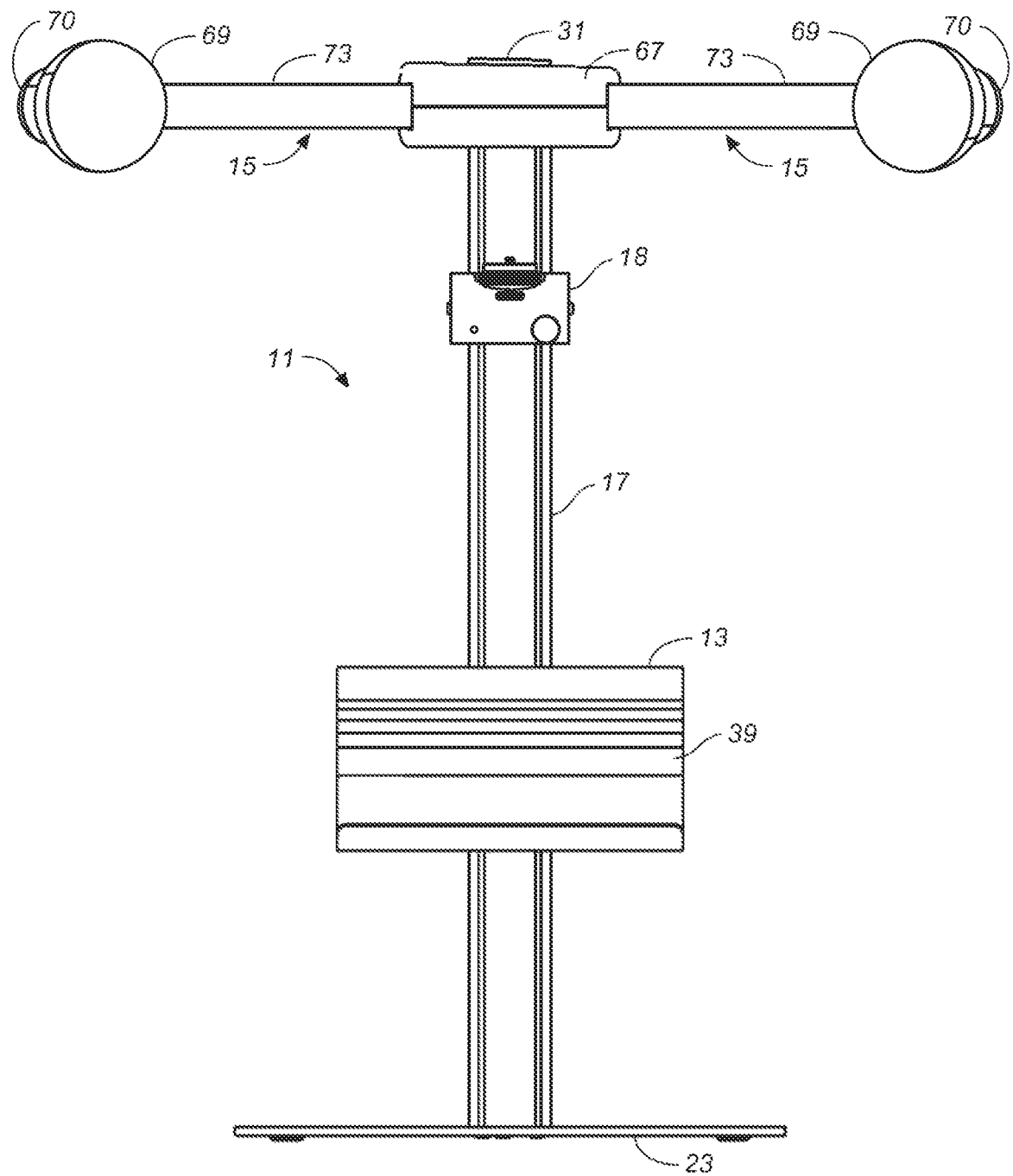
FIG. 4 is a front elevational view thereof.
Figure 5:
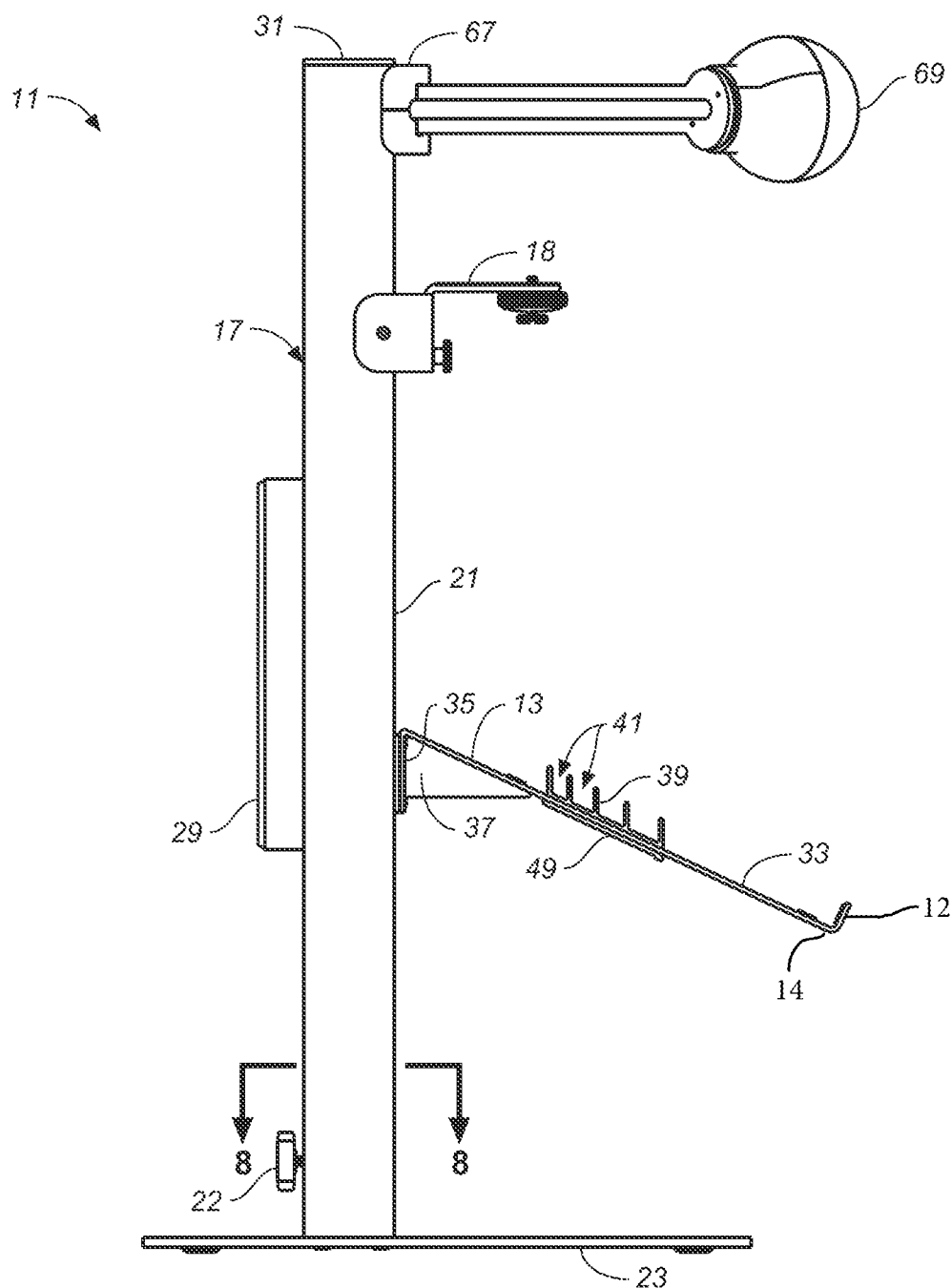
FIG. 5 is a left side elevational view thereof.
Figure 6:
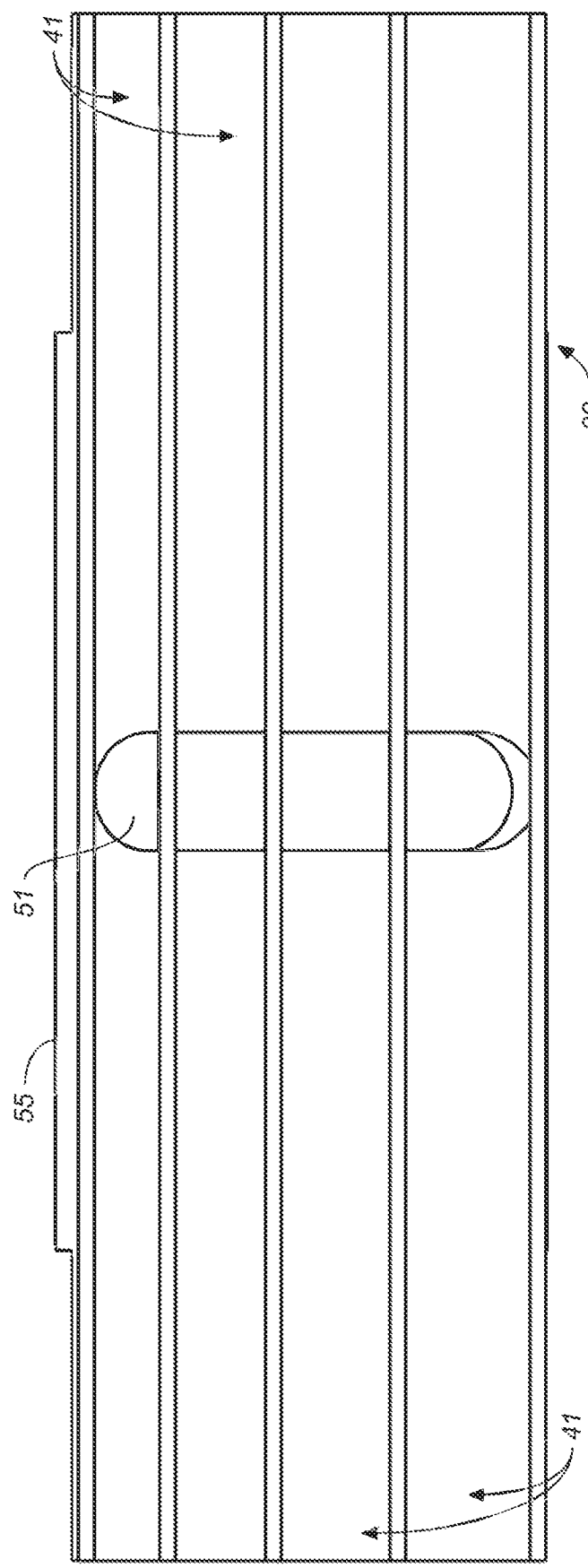
FIG. 6 is a top plan view of the platform adaptor for the apparatus.
Figure 6A:
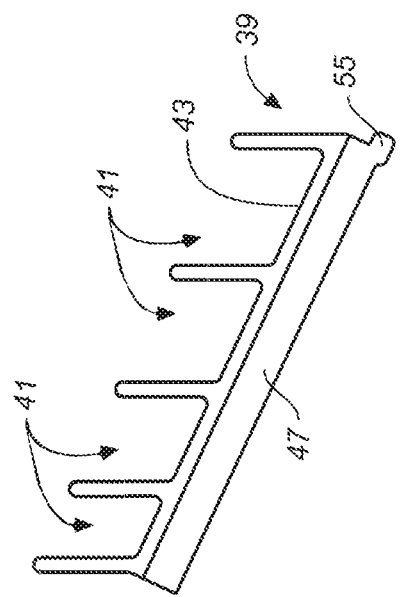
FIG. 6A is a left side elevational view thereof.
Figure 7:
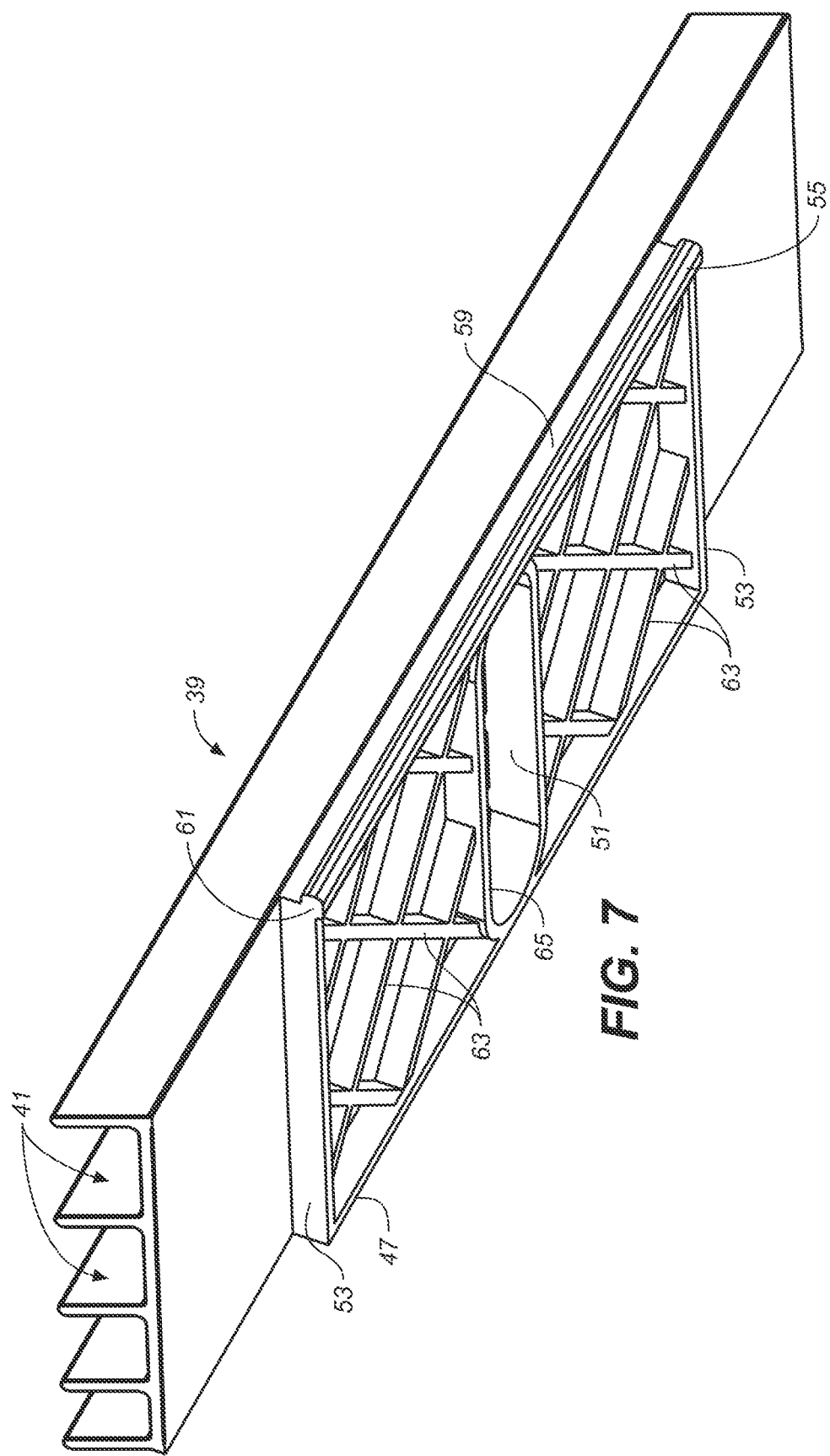
FIG. 7 is a bottom perspective view thereof.

As seen in FIG. 7, the male plug structure 47 on the bottom of the adapter has a rectangular perimeter wall 53 that defines the width and length of the plug structure. A protruding lip 55 is provided along the bottom edge 57 of the front long wall 59 of the plug's perimeter wall. When the adaptor is plugged into opening 45 in the top wall of the device support platform, this lip can be hooked under the front long edge 61 of the top wall plug-in opening (this edge is shown in FIG. 3A) to fix the adaptor in place. Cross-ribs 63 extending between segments of the perimeter wall of the adaptor's male plug structure along with the walls 65 forming the adapter's oblong center opening 51 provide the adaptor with further structural rigidity.

The illustrated facial lighting unit 15 is attached to the post assembly 17 above the mobile device support platform 13 by means of a center bracket housing 67. This bracket housing includes a connector similar to the later described connector 14 that is used to attach the mobile device support platform to the outer slide post 21 of the post assembly.

The facial lighting unit is seen to include two light sources in the form of lamps 69 held by lamp sockets 70 at the distal ends 71 of extension arms 73. As best shown in FIGS. 3 and 3A, the extension arms preferably extend forwardly from the post assembly at an angle of about 45 degrees from the center plane A of the apparatus, such that the face of the user is illuminated by the lamps 69 from an angle of about 45 degrees. In this manner, the user's face will receive direct light from two sides to achieve substantially uniform facial illumination when looking into the camera of the camera-enabled mobile device supported on the mobile device platform. Other positional deployments of the lamps of the lighting unit are possible and the lighting unit could be constructed such that angle of the extension arms are adjustable.

It is noted that lamps 69 can be commercially available LED lamps and the lamp sockets can be commercially available drivers for the lamps which will allow for adjustment of both the color and intensity of the light on the user's face. Such lamps may require a heat sink for dissipating heat generated by the lamps. An example of such a commercially available heat sink is shown in FIG. 1B, where the heat sinks 68 are attached to the back of the drivers 70 for the lamps.

The lamp sockets (or drivers) are electrified from the power strip 29 on the post assembly 17. The needed wiring can extend to the bracket housing 67 through suitable wire channels (not shown) in the extension arms, and from there a power cord of suitable length (also not shown) can be provided which plugs into the power strip.

The facial lighting unit can thus provide an improved lighting environment for the user within the camera coverage area of the mobile device. Similar to the mobile device support platform, the height of the lighting unit can be adjusted to meet individual requirements.

FIGS. 8 and 8A-8C illustrate the construction of the vertical post assembly 17 and how the mobile device support platform 13, lighting unit and the auxiliary device mounting bracket 18 are adjustably attached to the post assembly.

Figure 8:
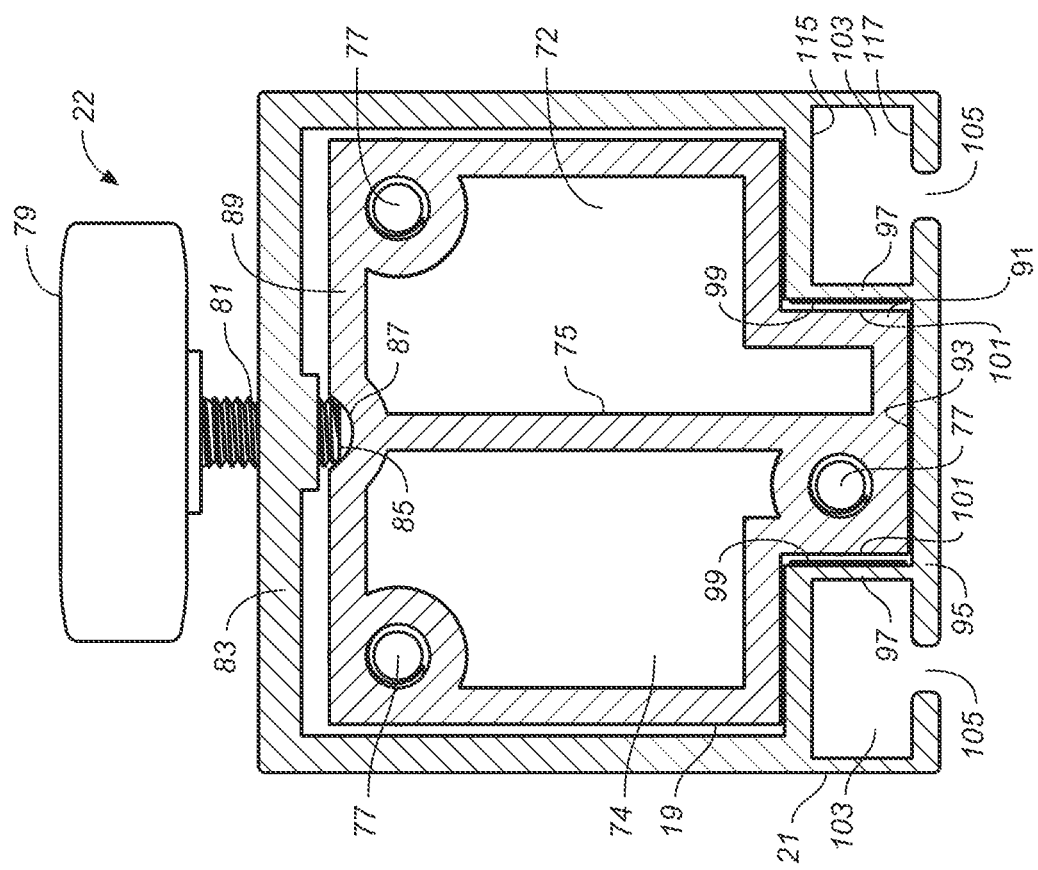
FIG. 8 is a cross-sectional view of the vertical post assembly of the apparatus taken along section lines 8-8 in FIG. 5.

As seen in the FIG. 8 cross-sectional view, inner anchor post 19 and outer slide post 21 of the vertical post assembly 17 have uniform and complimentary cross-sectional shapes that allow the outer slide post to slide over the anchor post. These two components of the post assembly can suitably be fabricated of an extruded material such as extruded aluminum, which offers strength and is light weight. Interior portions of the anchor post are hollowed out to form channels 72, 74 divided by a reinforcing center wall 75 running the length of the post. Holes 77 running through three corners of the anchor post can be tapped at the bottom end of the anchor post to provide for screw attachments for footer plate 23 or other footed structure. The adjustment knob 22 for adjusting the height of the slide post is seen to have a gripping portion 79 and a threaded end 81 extending from the gripping portion which is screwed through a corresponding threaded hole (not shown) in the slide post's backwall 83. When the adjustment knob is tightened, the tip 85 of the knob's threaded end engages in a longitudinal groove 87 centered in the anchor post's backwall 89. Groove 87, which can run the length of the anchor post, helps to keep the slide post locked in position without any wobble when the adjustment knob is tightened.

With further reference to FIG. 8, it can be seen that along the front facing side of the vertical support apparatus the slide post and anchor post are configured to accommodate a narrow projecting part 91 of the anchor post, which fits within an inwardly facing slide channel 93 in the slide post formed by the front wall 95 and side walls 97 of the slide post. Strips of material 99 having low surface friction, such as Teflon strips, can be adhered or otherwise affixed to the inner surfaces of the side walls 97 of slide channel 93 to facilitate the sliding of the slide post on the anchor post. Strips 99 are suitably short strips adhered to the side walls of the slide channel near the bottom of the slide post; similar low friction strips of material (not shown) can be adhered to the outer surfaces of the sidewalls 101 of the projecting part 91 of the anchor post at or near the top end of the anchor post. By providing low friction strips of material of suitable thickness on these facing wall structures of the vertical post assembly, the strips of material can serve to prevent the slide post from being lifted beyond a given height on the anchor post.

As above mentioned, the device support platform 13, facial lighting unit 15 and mounting bracket 18 for an auxiliary device (if needed) are attached in height adjustable positions to the forward facing side of the vertical post assembly, and more specifically to the outer slide post of the assembly. In the illustrated embodiment of support post assembly 17 this is achieved via locking channels 103 at the two forward corners of the slide post. Each of these locking channels has a front facing access slot 105 running the length of the channels. Use of these locking channels to attach and adjustably position the device support platform to the outer slide post of the vertical post assembly is now described in reference to FIGS. 8A-8C.

Figure 8A:
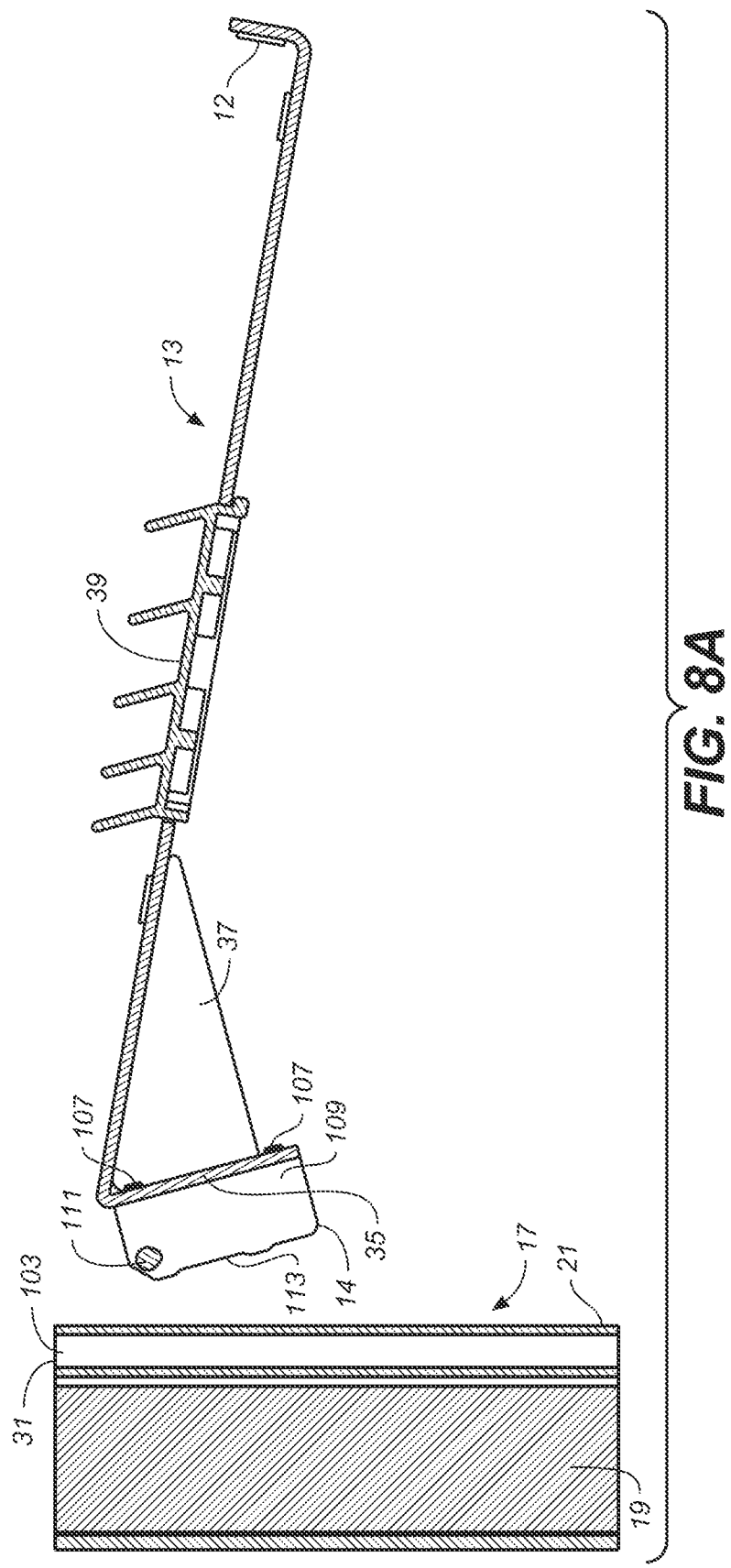
FIG. 8A is a fragmentary, cross-sectional view of the vertical post assembly and the device support platform of the apparatus shown in the foregoing figures, showing the device support platform removed from the post assembly.

FIGS. 8A-8B are cross-sectional views of the vertical post assembly 17 and device support platform 13 in the vertical plane showing the device support platform 13 having a sliding post connector 14 attached to the platform's backwall 35 being maneuvered from a position of disengagement from the outer slide post to a position of engagement on the slide post. For illustrative purposes, only the top end 31 of the slide post 21 is shown. It is at the top end of the slide post where the support platform is inserted into the front locking channels of the slide post.

Figure 8C:
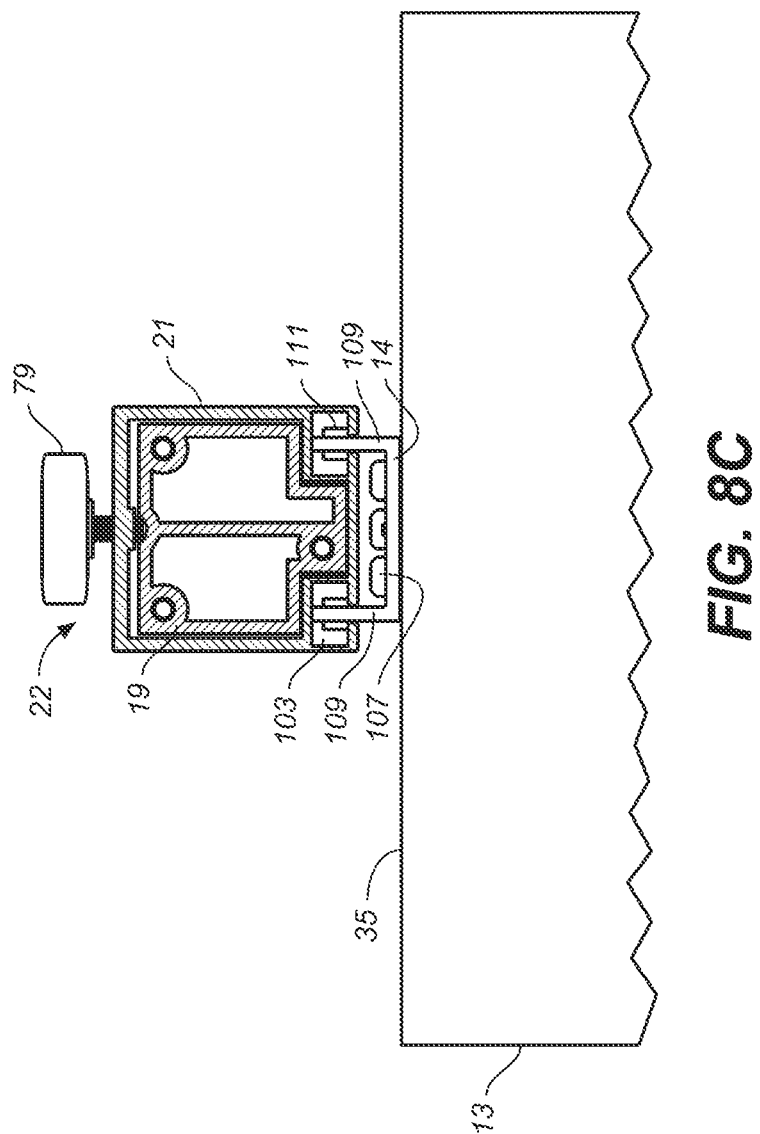
FIG. 8C is a fragmentary, cross-sectional view of the vertical post assembly of the apparatus illustrated in the foregoing figures with the support platform connected to the vertical post assembly as shown in FIG. 8B.

FIG. 8C is a fragmentary cross-sectional view, taken in the horizontal plane, of the vertical post assembly with the device support platform attached to the outer slide post of the vertical post assembly as shown in FIG. 8B. As best seen in FIG. 8C, the post connector 14 is a U-shaped member attached to the back wall 35 of the device support platform by fasteners 107. The rearwardly extending flat sidewalls 109 of the post connector are sized and spaced apart so that they can fit through the access slots 105 of the locking channels 103 when the connector is engaged in the locking channels.

As seen in FIGS. 8A-8C, a laterally extending wedge post 111 affixed to each of the connector sidewalls 109 allows post connector 14 to be locked in the locking channels 103 of the outer slide post 21 at any desired height along the slide post. More specifically, FIG. 8A shows the device support platform removed from the post assembly 17 of the apparatus but positioned near the top end 31 of the post assembly so that it is ready to install. The device support platform is installed on the outer slide post of the post assembly through the top end of the post assembly, and for this purpose the slide post cap 34 shown in FIGS. 1-5 needs to be removed. To install the mobile device support platform 13 on the outer slide post, the platform's post connector 14 is inserted into the locking channels 103 at roughly the angle shown in FIG. 8A, such that the ends of the connector sidewalls 109 with the wedge posts 111 engage in the locking channels. Holding the support platform at the angle shown in FIG. 8A, the platform can be slid down the outer slide post to the desired height. At the desired height, the device support platform is rotated down so that back edges 113 of the connector's sidewalls 109 wedge against the rear inside walls 155 of the locking channels while the wedge posts of the connector wedge against the front inside walls 117 of the locking channels. When thusly rotated, the device support platform will be locked in place on the slide post of the vertical post assembly.

To further adjust the height of the device support platform, the device support platform is simply rotated up to release the wedging action of the platform connector as above-described to allow the platform to be slid up or down on the outer slide post. When the new desired height is achieved, the device support platform is again rotated down to lock the platform in place. Using similar connectors, the facial lighting unit 15 and auxiliary device mounting bracket 18 can be similarly attached to and adjusted on the outer slide bar of vertical post assembly 17.

Figure 9:
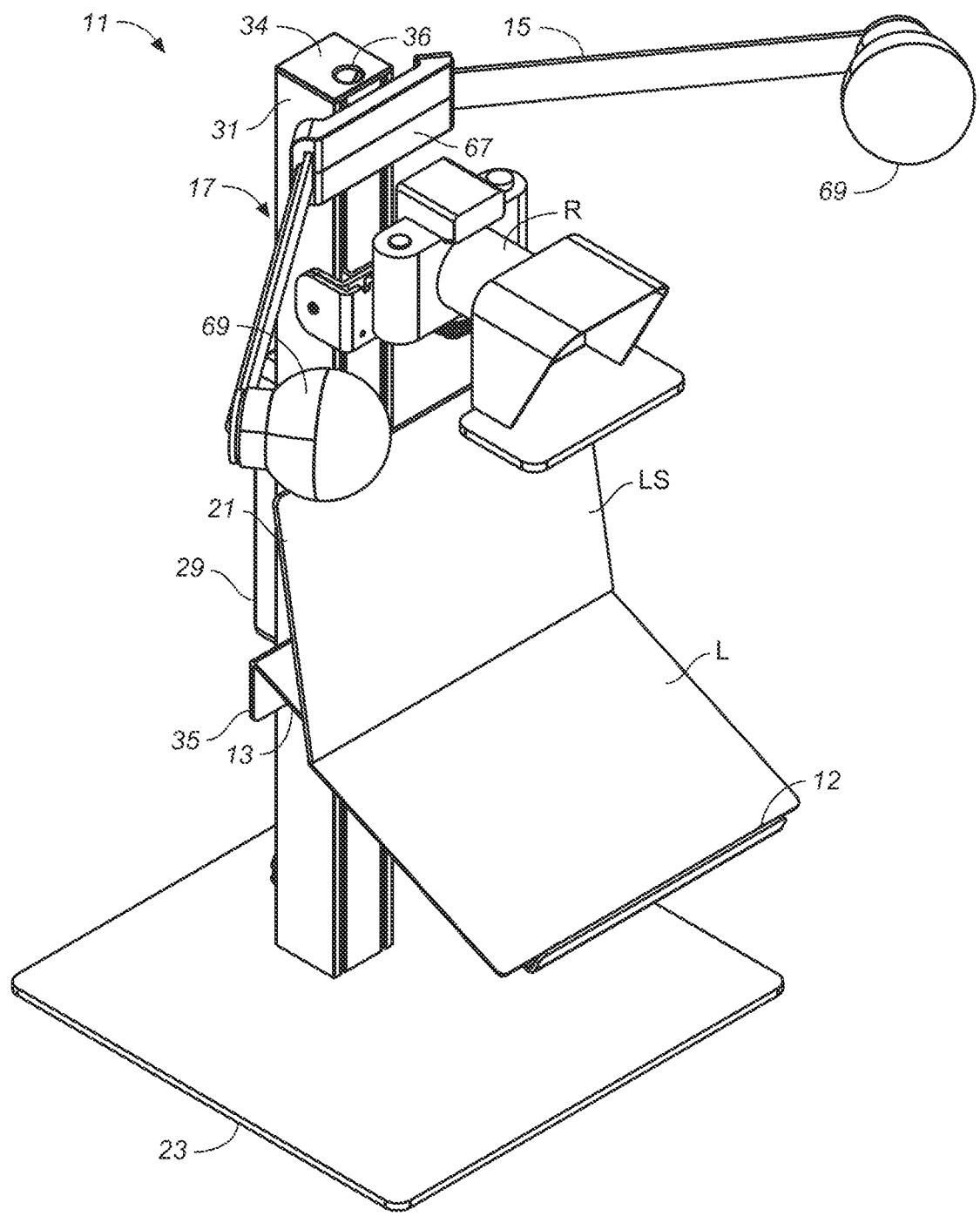
FIG. 9 is a front left side perspective view of the mobile computer device support apparatus as illustrated in the forgoing figures with a laptop computer supported on the device support platform of the apparatus.
Figure 10:
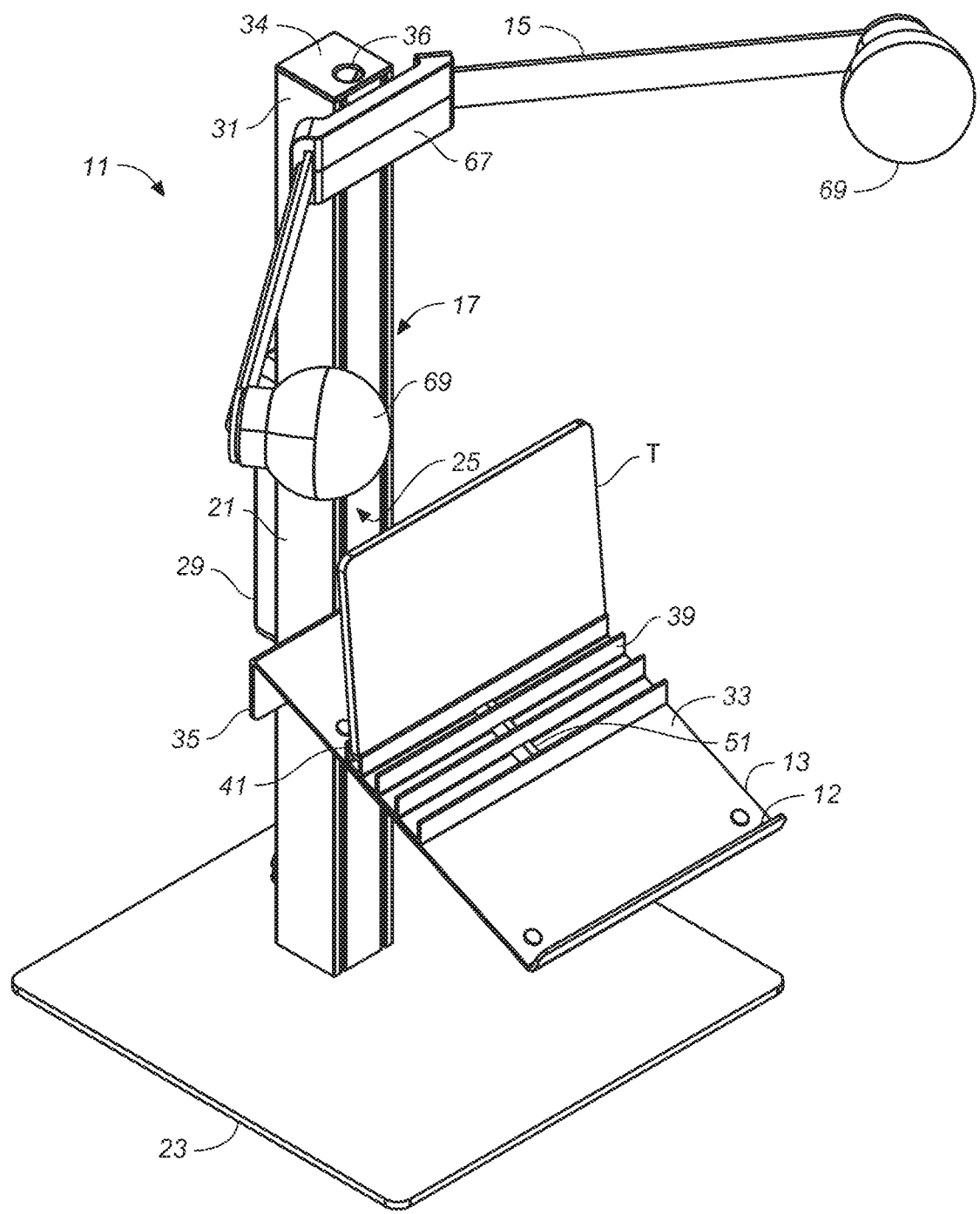
FIG. 10 is a front left side perspective view of the mobile computer device support apparatus as illustrated in the forgoing figures with a computer tablet supported on the device support platform of the apparatus.
Figure 11:
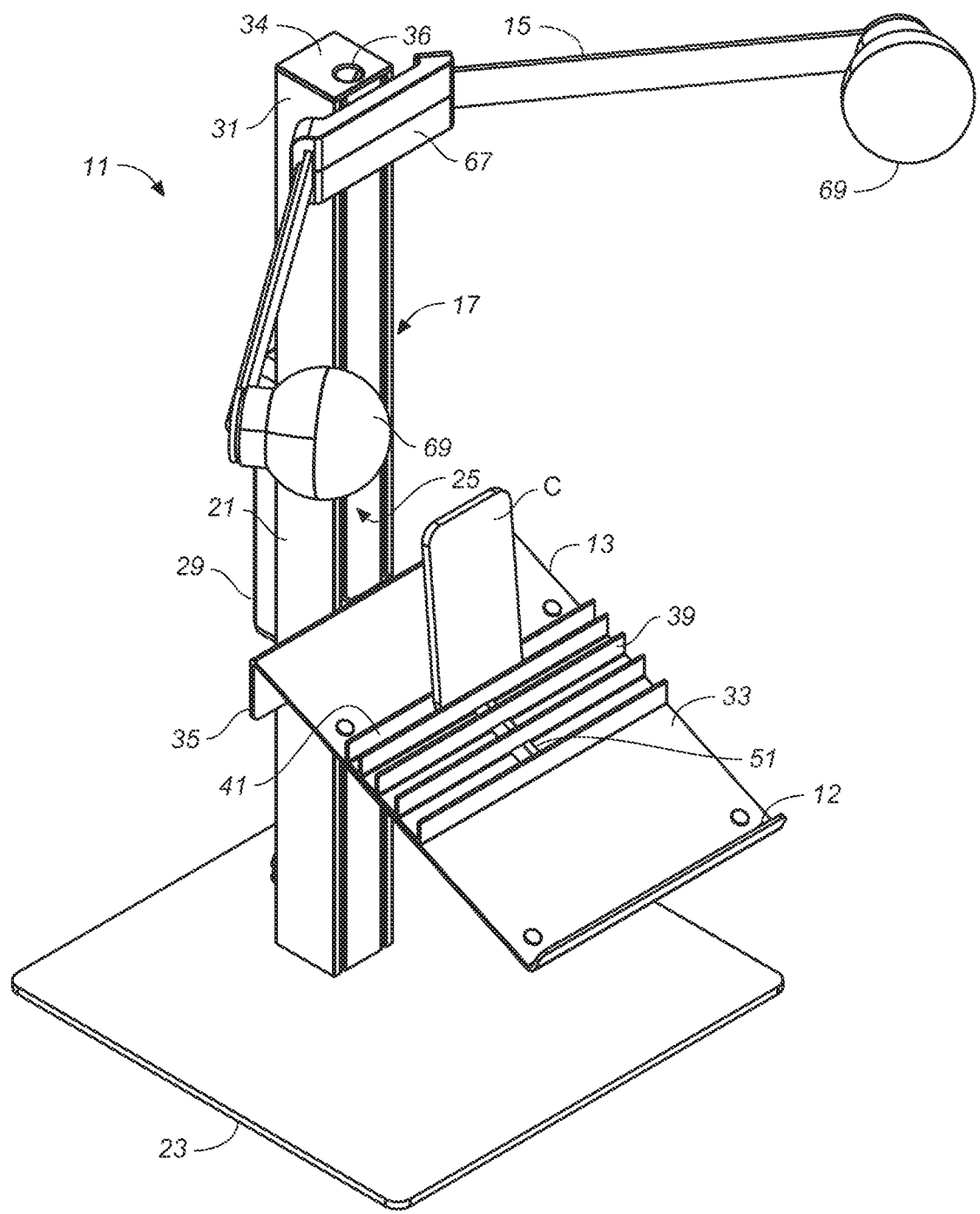
FIG. 11 is a front left side perspective view of the mobile computer device support apparatus as illustrated in the forgoing figures with a cell phone supported on the device support platform of the apparatus.

FIGS. 9-11 illustrate how the embodiment of the mobile device support apparatus shown in FIGS. 1-5 supports various mobile computer devices as well as an auxiliary camera.

In FIG. 9, apparatus 11 is seen to be supporting a clamshell laptop computer L having a fold-out computer screen LS with a camera (not shown) conventionally embedded in a centered position in the top border region of the fold-out screen. (When used to support a laptop computer, the previously described platform adaptor 39 is removed.) The keyboard base of the laptop, which rests against the upturned lip 12 at the bottom edge 14 of the support platform 13, lies at an angle due to the angle of the device support platform. This angle can suitably be about 25 degrees from horizontal. The screen can be folded out so that it lies in a nearly vertical plane with the embedded camera pointed directly at the user facing the screen. Also shown in FIG. 9 is a separate auxiliary camera/teleprompter K affixed to auxiliary device mounting bracket 18 so that the teleprompter similarly faces the user. The lamps 69 on the lighting unit 15 directly above the camera/teleprompter will illuminate both sides of the face of the user at an approximately 45 degree angle.

FIG. 10 shows the same apparatus as shown in FIG. 9, but with the adaptor 39 installed on the device support platform. In this figure, tablet computer T is placed edgewise in one of the transverse channels 41 of the adaptor, selected in accordance with the thickness of the tablet at its bottom edge. Here, it can be seen that the tablet and its display screen are also oriented in a near vertical plane such that the display screen and the tablet's embedded camera face the user who has positioned himself or herself comfortably in front of the apparatus.

FIG. 11 shows a cell phone C held edgewise in a similar manner in one of the selected channels 41 of platform adapter 39. If the cell phone has a different thickness than the tablet, a different suitably sized channel on the adapter would be selected.

In FIGS. 10 and 11, it can be seen that, in the case of both the tablet and the cell phone, the depth of the adaptor channels is such that they secure and hold the perimeter edges of the devices only and do not otherwise obstruct the faces of the planar mobile devices. By selecting a channel with a suitable width, the channel will prevent the planar mobile device from tipping over or being easily knocked off the apparatus.

Figure 12A:
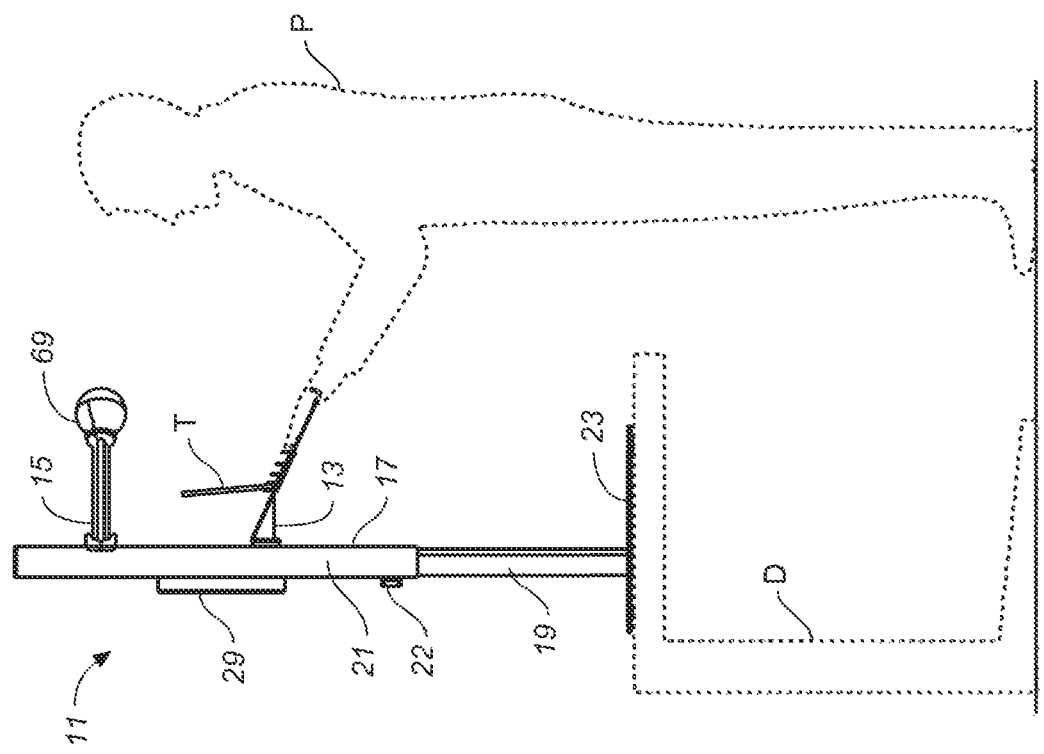
FIG. 12A is a pictorial view showing a person using the embodiment of the invention illustrated in the foregoing figures in a sitting position.
Figure 12B:
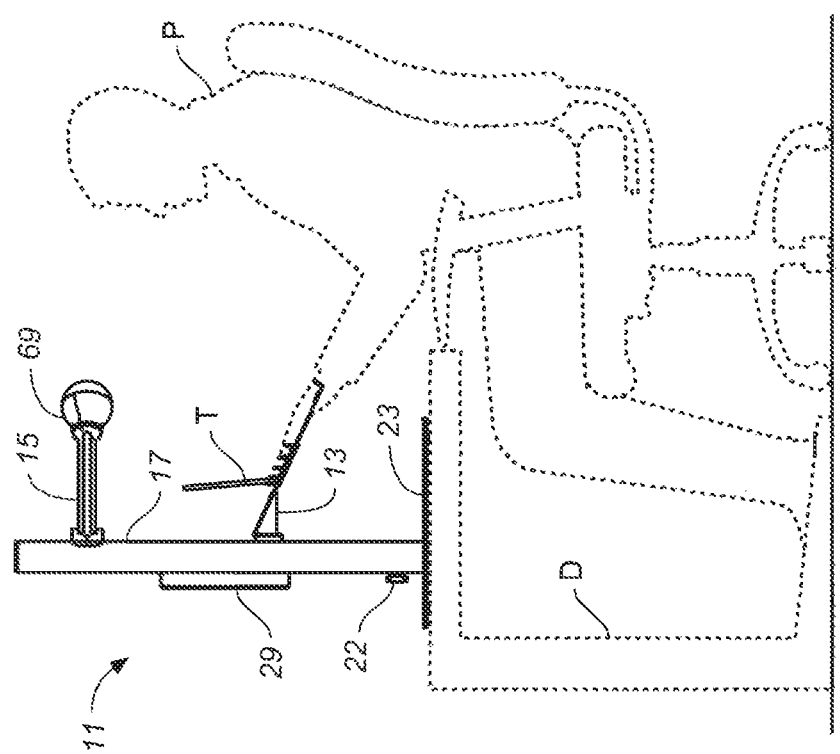
FIG. 12B is a pictorial view showing a person using the embodiment of the invention illustrated in the foregoing figures in a standing position, and wherein the outer slide post has been extended as shown in FIG. 1B.

FIG. 12A shows the mobile device apparatus 11 above described supporting a tablet computer T and set on a top of a desk D with a person/user P seated in front of the desk within the coverage area of the tablet's embedded camera. In this figure, the vertical post assembly is adjusted all the way down so that the tablet and its embedded camera faces the user. FIG. 12B shows the apparatus 11 resting on the same tabletop D with the outer slide post 21 of the apparatus, which carries the device support platform and the lighting unit, adjusted upwardly on the inner anchor post 19 to accommodate the same person P in a standing position. It is seen that the pre-set separation of the lighting unit and device support platform on the outer slide post of the post assembly remain unchanged when the slide post is raised. This height adjustment is made using the adjustment knob 22 as explained above. The height to which the device support platform is adjusted is chosen such that when standing the person's face is within the camera coverage area of the tablet.

To accommodate a suitable range of vertical height adjustments needed to accommodate individuals of different heights and in different positions, as exemplified by the sitting and standing positions shown in FIGS. 12A and 12B, the outer sliding post 21 of the post assembly will suitably measure about 30 inches from the top of the post to the footer structure of the apparatus 11 (plate 23 in FIGS. 12A and 12B), and when extended to its maximum height, the measurement from the top of the post to the footer structure will suitably be about 56 inches. These measurements are exemplary measurements believed to accommodate most individuals' needs for supporting their mobile computer device and the lighting unit at optimal heights.

Figure 13:
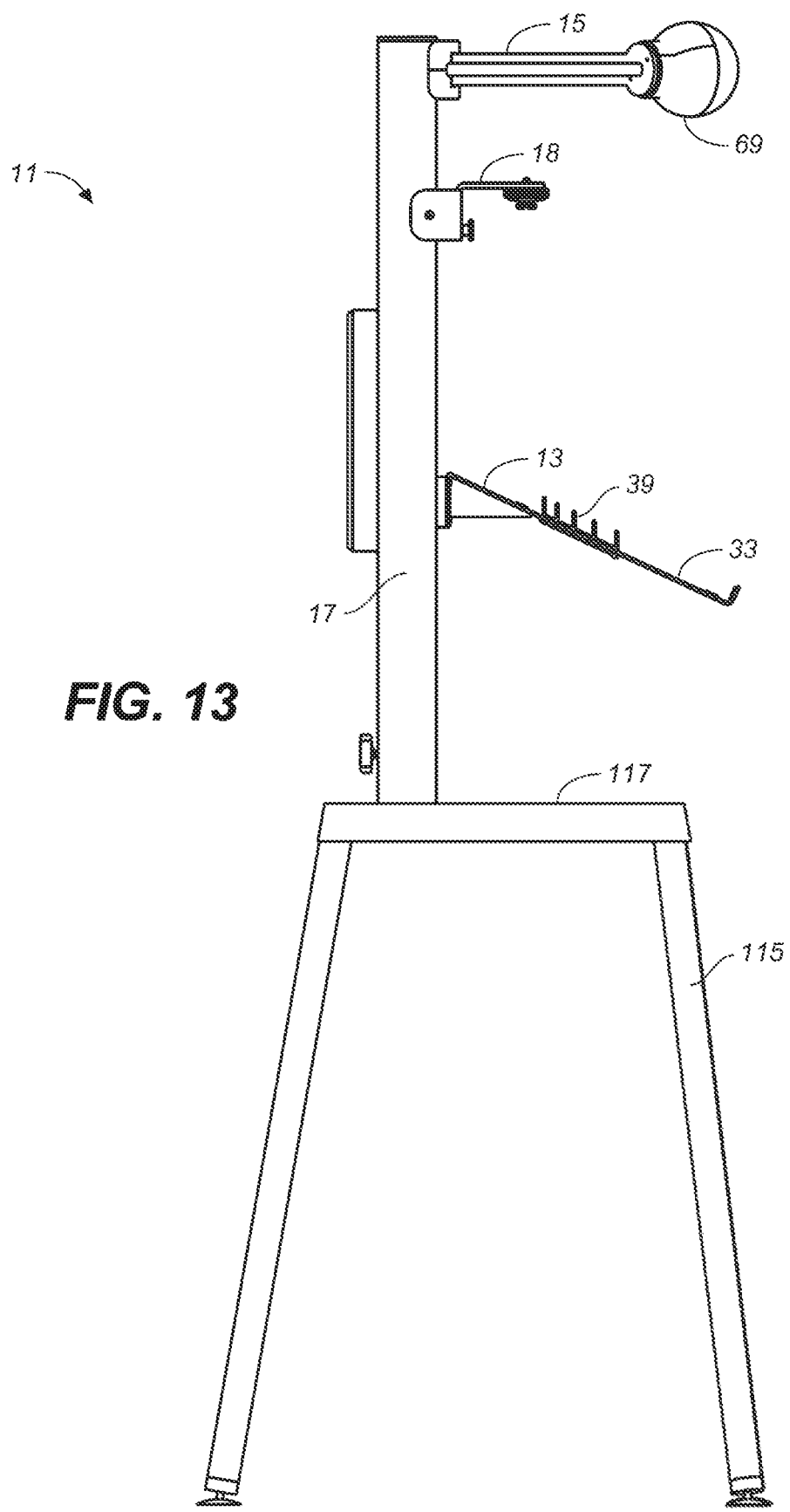
FIG. 13 is a left side, elevational view of a mobile computer device support apparatus in accordance with the invention as illustrated in the foregoing figures, but with its own elevated stand.
Figure 14:
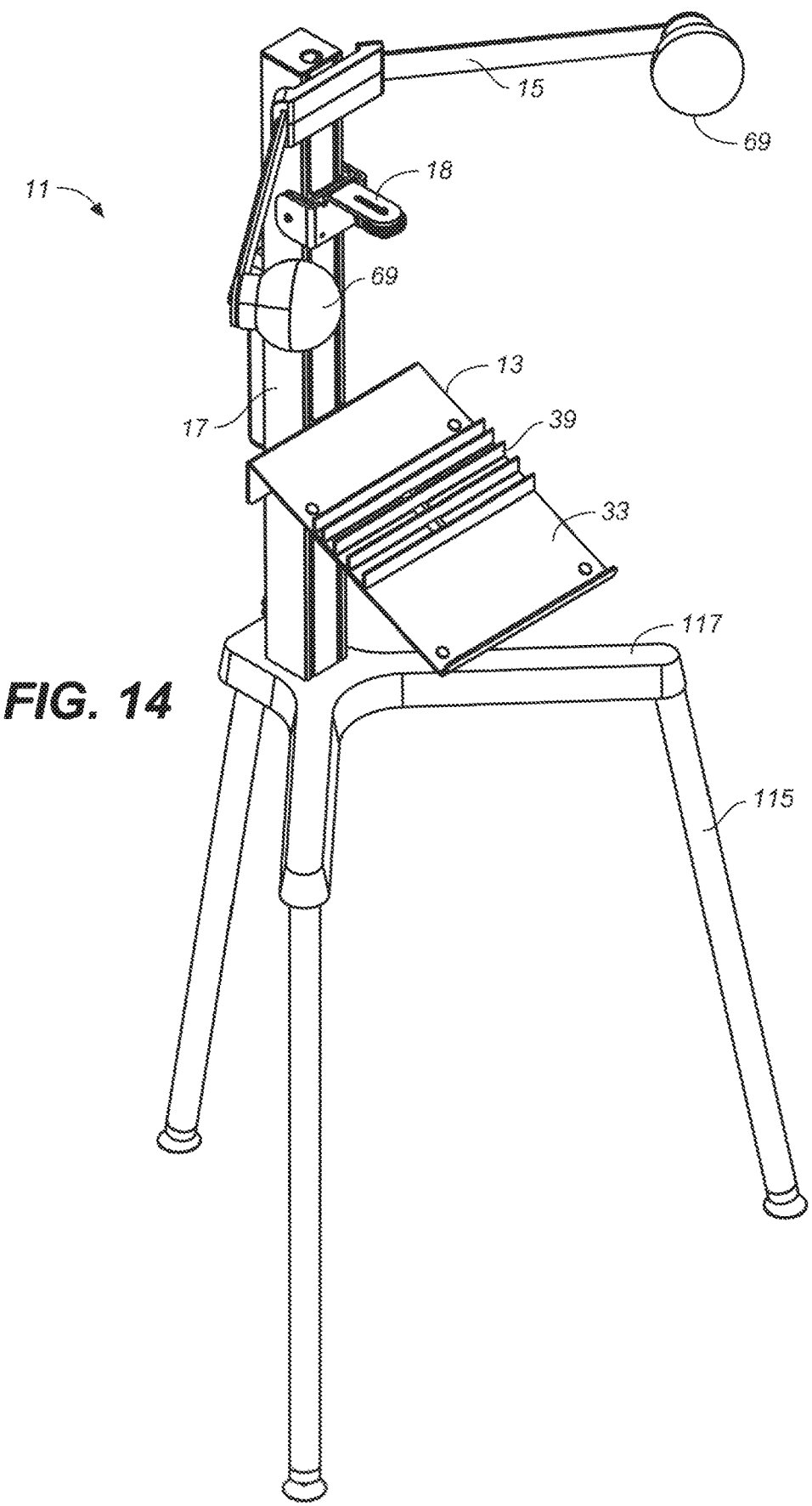
FIG. 14 is a front, left side perspective view thereof.

FIGS. 13 and 14 show the same mobile device support apparatus as shown in FIGS. 1-5, except with a footer structure in the form of a three-legged elevated stand 115 instead of the flat footer plate illustrated in those figures. The vertical post assembly 17 can be secured to the top plate 117 of the stand by any suitable means, such as by screw fasteners (not shown). Providing such a stand will facilitate the use of the apparatus of the invention in spaces where there are no convenient desktop or counter top surfaces on which to set an apparatus of the invention.

While a preferred embodiment of the invention has been described in detail in the foregoing specification, it is not intended that the invention be limited to such detail. For example, other vertical post structures might be employed, such as a single vertical support post that requires independent adjustment of the device support platform and lighting unit on the post. Alternative constructions for the support platform are also possible. For example, a mobile device platform that is horizontal rather than angled is considered within the scope of the invention. The platform adapter could also be constructed differently so long as it is capable of edgewise holding planar, camera enabled mobile computer devices such as tablets and cell phones in an upright orientation as above-described. For example, the adaptor could provide for one or more channels having an adjustable channel wall such that the width of the channel could be adjusted to the thickness of the edge of the mobile device. This would require means for adjusting the position of at least one of the channel walls of the adaptor channel, which would add complexity and add to the cost of manufacture of the apparatus. The multichannel version of the adaptor illustrated and described herein has the advantage of ease of use and ease of construction.

We claim:

1. A support platform for supporting different camera enabled mobile computer devices, including planar mobile computer devices having a display screen in the plane of the device and perimeter edges bounding the display screen, and clamshell mobile computer devices having a generally planar keyboard base and display screen that in use is folded out from the planar base, the display screens of the mobile computer devices each having camera coverage areas in front of the device's display screen, wherein a person who uses the mobile computer device for a video session must position himself or herself in front of the display screen of the mobile computer device to be within the camera coverage area in front of the device's display screen, the support platform comprising:
   a top wall configured to support a clamshell mobile computer device with a folded out display screen such that the folded out display screen is in a forward facing orientation and such that a person positioned in front of the support stand may view the display screen of the mobile computer device while being within the camera coverage area of the mobile computer device, and an adaptor removably mountable to the top wall of the support platform, the adaptor having a top side and at least two transverse channels extending upwardly therefrom, the at least two transverse channels having different widths to capture and hold a perimeter edge of planar mobile computer devices having different thicknesses so as to position the display screen of the planar mobile computer device in a suitable front facing orientation where it can be viewed by a user and where the user is within the camera coverage area of the camera for the mobile device.

2. The support platform of claim 1 wherein the top wall of the support platform is angled downwardly relative to horizontal and wherein the at least two transverse channels on the removable adaptor are upright channels such that, when the adaptor is mounted on the top wall of the angled support platform, the adaptor is able to support different planar mobile computer devices having different thicknesses in a substantially vertical forward facing orientation.

3. The support platform of claim 1 wherein the top wall of the support platform has at least one vent opening capable of conveying heat away from a clamshell mobile computer device operatively supported on the top wall over the vent opening.

4. The support platform of claim 1 wherein the top wall of the support platform has at least one plug-in opening and wherein the adaptor used for holding camera enabled planar mobile computer devices is configured to removably plug into the at least one plug-in opening.

5. The support platform of claim 4 wherein at least one plug-in opening in the top wall of the support platform is configured to act as a vent through the top wall for carrying away heat generated by a clamshell mobile computer device when operatively supported on the top wall of the support platform.

6. A support platform for supporting different camera enabled mobile computer devices, including planar mobile computer devices having a display screen in the plane of the device and perimeter edges bounding a display screen, and clamshell mobile computer devices having a generally planar keyboard base and display screen that in use is folded out from the planar base, the display screens of the mobile computer devices each having camera coverage areas in front of the device's display screen, wherein a person who uses the mobile computer device for a video session must position himself or herself in front of the display screen of the mobile computer device to be within the camera coverage area in front of the device's display screen, the support platform comprising:

an angled top wall configured to support a clamshell mobile computer device with a folded out display screen such that the folded out display screen is in a forward facing orientation and such that a person positioned in front of the support stand may view the display screen of the mobile computer device while being within the camera coverage area of the mobile computer device, such top wall having at least one plug-in opening, and an adaptor configured to removably plug into the at least one plug-in opening in the top wall of the support platform, the adaptor being configured to capture and hold an edge of a planar mobile computer device, such as a tablet or cell phone, so as to position the display screen of the device in a suitable front facing orientation where it can be viewed by a user and where the user is within the camera coverage area of the camera for the mobile device.

7. The support platform of claim 6 wherein the adaptor for the device support platform has a top side and a plurality of transverse channels extending upwardly from the top side thereof, such channels being configured to capture and hold an edge of planar mobile computer devices having different thicknesses.

8. The support platform of claim 7 wherein at least one plug-in opening in the top wall of the support platform is configured to act as a vent through the top wall for carrying away heat generated by a clamshell mobile computer device when operatively supported on the top wall of the support platform.

9. The support platform of claim 6 wherein the top wall of the support platform has a bottom edge and upturned lip positioned at the bottom edge of the top wall against which the key board base of a clamshell mobile computer devices can rest when placed on the support platform's top wall.

10. The support platform of claim 1 wherein a plurality of transverse channels extend upwardly from the top side of the adaptor, and wherein each of the upwardly extending transverse channels has different widths that allow such channels to receive, capture and hold different planar mobile computer devices having different thicknesses.

11. A support platform for supporting different camera enabled mobile computer devices, including planar mobile computer devices having a display screen in the plane of the device and clamshell mobile computer devices having a generally planar keyboard base and display screen that in use is folded out from the planar base, the display screens of the mobile computer devices each having camera coverage areas in front of the device's display screen, wherein a person who uses the mobile computer device for a video session must position himself or herself in front of the display screen of the mobile computer device to be within the camera coverage area in front of the device's display screen, the support platform comprising:

a top wall configured to support a clamshell mobile computer device with a folded out display screen such that the folded out display screen is in a forward facing orientation and such that a person positioned in front of the support stand may view the display screen of the mobile computer device while being within the camera coverage area of the mobile computer device, and an adaptor removably mountable to the top wall of the support platform, the adaptor being configured to capture and hold planar mobile computer devices, such as a tablet or cell phone, so as to position the display screen of the device in a suitable front facing orientation where it can be viewed by a user and where the user is within the camera coverage area of the camera for the mobile device, wherein the top wall of the support platform has at least one plug-in opening and wherein the adaptor used for holding camera enabled planar mobile computer devices is configured to removably plug into the at least one plug-in opening.

12. The support platform of claim 4 wherein at least one plug-in opening in the top wall of the support platform is configured to act as a vent through the top wall of the support platform for carrying away heat generated by a clamshell mobile computer device when operatively supported on the top wall of the support platform.

* * * * *